May 1, 1923.
H. P. SPARKES
1,453,414
MEASURING INSTRUMENT
Filed May 6, 1919
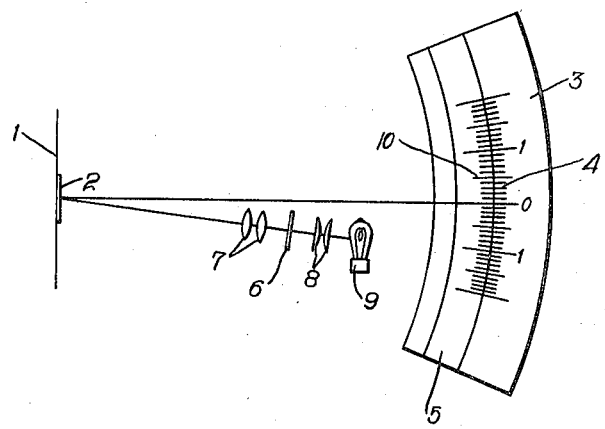
WITNESSES:
INVENTOR
Harry P. Sparkes,
BY
ATTORNEY

Patented May 1, 1923.

1,453,414

UNITED STATES PATENT OFFICE.

HARRY P. SPARKES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

Application filed May 6, 1919. Serial No. 295,183.

*To all whom it may concern:*

Be it known that I, HARRY P. SPARKES, a citizen of the United States, and a resident of Edgewood Park, in the county of Allegheny and State of Pennsylvania, have invented a new and useful Improvement in Measuring Instruments, of which the following is a specification.

My invention relates to measuring instruments and particularly to means for, and methods of, facilitating the observation of the indications thereof.

One object of my invention is to provide a vernier scale for a galvanometer.

Another object of my invention is to provide means whereby a vernier scale may be so projected as to co-operate with a second vernier scale to facilitate reading the deflections of a mirror galvanometer.

In practicing my invention, I provide a stationary vernier scale, a transparent vernier scale and means for projecting the image of the transparent scale through the mirror of a galvanometer to the stationary vernier scale. With this arrangement, deflection of the mirror will cause apparent movement of one scale with respect to the other, whereby the extent of the deflection may be determined with great accuracy.

The single figure of the accompanying drawing is a diagrammatic view of a measuring instrument embodying my invention.

The movable member 1 of a galvanometer is provided with a mirror 2, as is ordinarily done in standard mirror galvanometers. A stationary member 3, upon which is disposed a scale 4, has a blank portion 5 adjacent the portion upon which the scale 4 is marked. A transparent member 6 is provided with a scale similar to the scale 4, and lens members 7 and 8 are provided, at the respective sides of the member 6, in alinement with a light source 9. The members 6, 7, 8 and 9 are so positioned that when the mirror 2 is in its normally inoperative position, the scale that is marked on the transparent member 6 is projected upon the portion 5 of the member 3 to thus form a scale 10 thereon.

When the mirror 2 is deflected by reason of the operation of he galvanometer, the scale 10 will appear to move relatively to the scale 4 and thus constitute a vernier scale that may be read with a high degree of accuracy to determine the deflection of the mirror 2.

It is not essential that the structure be as illustrated, as various means may be provided for projecting the image of the scale marked on the member 6 upon the portion 5 of the member 3, and I desire that only such limitations shall be imposed as are set forth in the appended claims.

I claim as my invention:

1. The combination with the movable element of a measuring instrument and a mirror thereon, of a stationary vernier scale, a second vernier scale, and means for projecting one scale upon the other through the agency of the mirror.

2. In a measuring instrument, the combination with an automatically movable mirror and a stationary vernier scale, of a transparent vernier scale, and means for directing a beam of light through the transparent scale against said mirror and therefrom to the stationary vernier scale.

3. In a measuring instrument, the combination with an automatically movable mirror and a stationary vernier scale, of a transparent vernier scale the image of which is adapted to be reflected by the mirror to co-operate with the other vernier scale.

4. In a measuring instrument, the combination with an automatically movable mirror and a stationary vernier scale, of a second stationary vernier scale the image of which is adapted to be reflected by the mirror to co-operate with the other vernier scale.

5. In a measuring instrument, the combination with an automatically movable mirror and a stationary vernier scale, of a second stationary scale so disposed with respect to said mirror that a reflected image thereof is superposed on the other stationary scale to facilitate accurate reading thereof.

6. The method of determining the deflection of a mirror-type galvanometer which consists in reflecting the image of a vernier scale on a co-operating vernier scale through the agency of the automatically movable mirror of the galvanometer and observing the relative positions thereof.

7. The method of determining the deflection of a mirror type galvanometer with accuracy which consist in projecting the image of a vernier scale on a co-operating scale through the agency of the automatically movable mirror of the galvanometer and observing the relative positions of said vernier scales.

8. The combination with a movable element of a measuring instrument and a mirror thereon, of a plurality of vernier scales and means for projecting one of said scales upon another through the agency of the mirror.

9. In a measuring instrument, the combination with an automatically movable element, of a pair of remotely related vernier scales and means co-operating with said movable element for projecting an image of one of said scales to co-operative adjacent position relative to the other.

10. A measuring instrument comprising two remotely disposed vernier scales and means responsive to an automatic measuring movement of the instrument for reflecting an image of one of said scales to adjacent co-operative position relative to the other.

In testimony whereof, I have hereunto subscribed my name this 23rd day of April, 1919.

HARRY P. SPARKES.